G. F. THOMPSON.
SAND TIRE.
APPLICATION FILED JUNE 6, 1912.

1,074,391.

Patented Sept. 30, 1913.

Witnesses
Rohe Meyer.
A. R. Fowler

Inventor
George F. Thompson
By Franklin H. Hough
Attorney

UNITED STATES PATENT OFFICE.

GEORGE F. THOMPSON, OF TUCUMCARI, NEW MEXICO.

SAND-TIRE.

1,074,391.   Specification of Letters Patent.   Patented Sept. 30, 1913.

Application filed June 6, 1912. Serial No. 702,047.

*To all whom it may concern:*

Be it known that I, GEORGE F. THOMPSON, a citizen of the United States, residing at Tucumcari, in the county of Quay and State of New Mexico, have invented certain new and useful Improvements in Sand-Tires; and I do hereby declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to certain new and useful improvements in sand tires for vehicle wheels and it has for its object the provision of a simple, efficient and serviceable sand tire band adapted for ready attachment to vehicle wheels and designed to serve effectually in preventing the tire of the wheel from cutting into sand or soft earth.

To this end and to such others as the invention may pertain, the same consists in the novel construction and in the peculiar arrangement, combination and adaptation of parts, all as more fully hereinafter described, shown in the accompanying drawings and then specifically defined in the appended claim.

Figure 1:
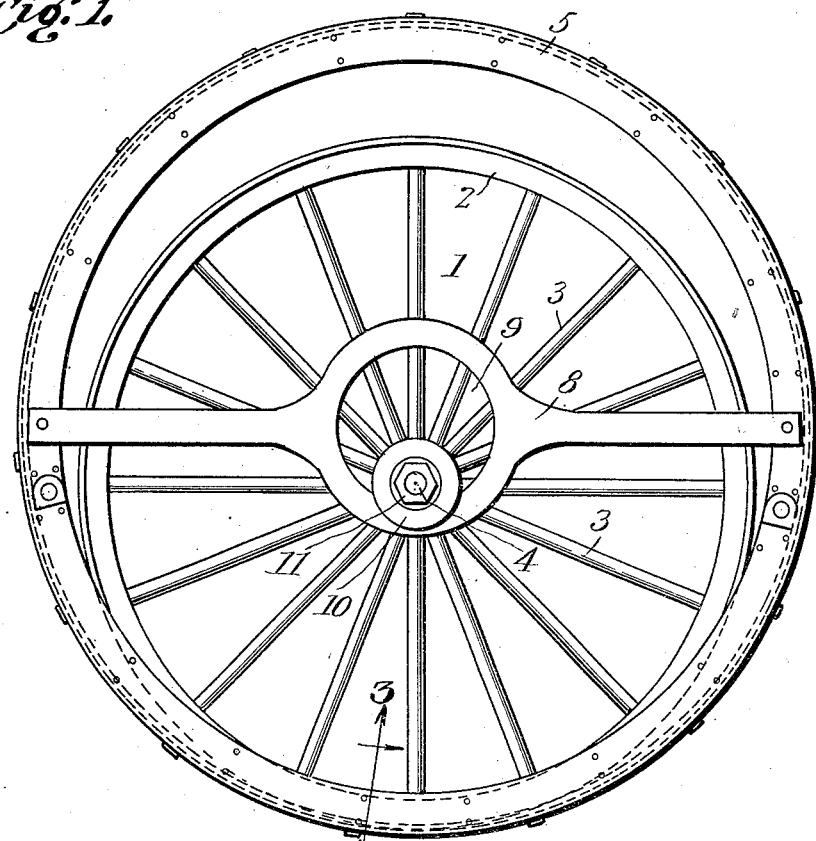
Figure 2:
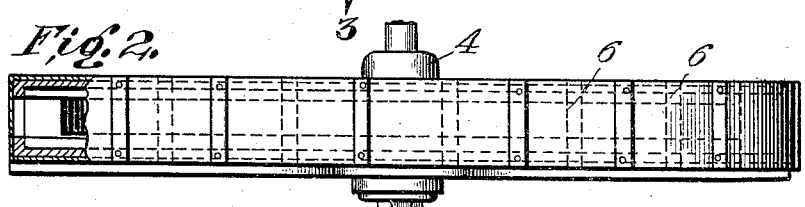
Figure 3:
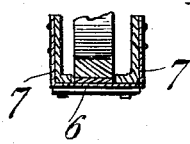
Figure 4:
Figure 5:
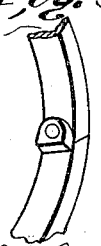

The invention is clearly illustrated in the accompanying drawings which, with the numerals of reference marked thereon, form a part of this specification and in which:

Figure 1 is a side elevation of a vehicle wheel with my invention applied thereto. Fig. 2 is an edge view of the wheel. Fig. 3 is a section upon the line 3—3 of Fig. 1. Fig. 4 is a detail in perspective showing the adjacent ends of two sections of the tire rim, the parts being separated in their relative positions, and Fig. 5 is a like view in which the parts are shown as connected.

Reference now being had to the details of the drawings by numeral, 1 represents a vehicle wheel of ordinary construction comprising a rim 2, spokes 3, 3 and hub 4.

5 represents my sand tire, comprising a series of sections 6, 6 composed of heavy canvas or other fibrous material adapted for the purpose. The sections 6 are bolted or otherwise secured within the recess provided with sectional and peripheral angle irons 7 which extend around the periphery of the tire upon either side thereof, the sections being pivotally connected at their ends, as shown in Fig. 1, and also illustrated in detail in Figs. 5 and 6. Bolted at its ends to the angle irons 7 upon diametrically opposite sides of the tire is a metallic plate 8 at the enlarged longitudinal center of which plate an opening 9 is provided. This opening, which is adapted to receive the hub 4 of the vehicle wheel which rotates therein, has a diameter exceeding the diameter of the wheel hub, the exact diameter being proportional to the size of the wheel and the diameter of the sand tire 5 inclosing the same, so as to insure at all times a free and uniform movement of the wheel and permit the vertical movement thereof where the wheel passes over sand or other surface.

It will be noted that the width of the space intervening between the angle irons 7, 7, which space is covered by the canvas sections 6 of the tire, conforms to the width of the felly of the wheel, so that the tire may move freely within the space.

A washer 10 is placed behind the usual bur nut 11 upon the axle and serves to prevent the tire sections from coming off the wheel while the spoke member or plate 8 serves to hold the sections in alinement with the edge of the tire.

From the foregoing description, the operation of the device will be readily understood.

By the provision of a protecting device as shown, it will be noted that a simple and efficient mechanism is afforded whereby a tire may be readily applied to the wheel of a vehicle when designed for use upon sandy or yielding soil or upon muddy or snowy roads, the wheel, by the use of the tire, being prevented from cutting deeply into the surface over which the wheel is passed. It will be noted that, when not designed for use, the tire may be readily removed by disconnecting and swinging open the sections and that, when not in use, it may be reduced to compact form and conveniently carried in an automobile or other vehicle in readiness for quick application when needed. It will be noted that the device is also equally adapted for use upon pneumatic vehicle tires and it will serve as a protection to the tire when the vehicle passes over rocky ground or other surface which would be likely to cut, injure or puncture the tire when not protected.

Having thus described my invention, what

I claim to be new and desire to secure by Letters Patent is:—

In combination with a vehicle wheel, an axle therefor, a bur upon the axle, a washer held to the axle by said bur, a sand tire comprising two sections which are hinged together, each section made of angle irons on the arcs of circles, the adjacent marginal edges of the angle irons being adapted to engage the opposite edges of the tire of said wheel, cross-pieces connecting the angle irons, a bar fastened at its ends to one of said sections at positions diametrically opposite each other and provided with a central opening through which the outer end of the axle extends, said bar being positioned behind said washer, as set forth.

In testimony whereof I hereunto affix my signature in the presence of two witnesses.

GEO. F. THOMPSON.

Witnesses:
C. B. McFarland,
Tom J. Taylor, Jr.